United States Patent [19]

Feller

[11] 4,333,354

[45] Jun. 8, 1982

[54] LIQUID FLOW SENSORS

[75] Inventor: Murray F. Feller, Citrus County, Fla.

[73] Assignee: Wilgood Corporation, Jacksonville, Fla.

[21] Appl. No.: 150,142

[22] Filed: May 15, 1980

Related U.S. Application Data

[63] Continuation-in-part of Ser. No. 31,416, Apr. 19, 1979, abandoned.

[51] Int. Cl.³ .............................................. G01F 1/10
[52] U.S. Cl. ................................................. 73/861.77
[58] Field of Search ........... 73/861.77, 861.79, 861.83, 73/861.89; 324/160, 166

[56] References Cited

U.S. PATENT DOCUMENTS

| 3,208,269 | 9/1965 | Eccles et al. | 73/861.77 |
| 3,377,556 | 4/1968 | Corcoran | 324/166 |
| 4,164,866 | 8/1979 | Mitchell et al. | 73/861.77 |

FOREIGN PATENT DOCUMENTS 804333 11/1958 United Kingdom ............ 73/861.77

Primary Examiner—Herbert Goldstein

[57] ABSTRACT

The disclosed sensors convert flow of liquid along a passage into electrical signals to represent rate or volume of the liquid flow. Vanes of a rotor are driven by the liquid so as to sweep past plural excitation and sensing electrodes that pass current through the liquid and sense the changing impedance caused by the vanes. The impedance of the liquid portion of the sensor circuit is modified at a frequency representing the travel of rotor vanes past the electrodes.

12 Claims, 9 Drawing Figures

FIG.1B
FIG.1C
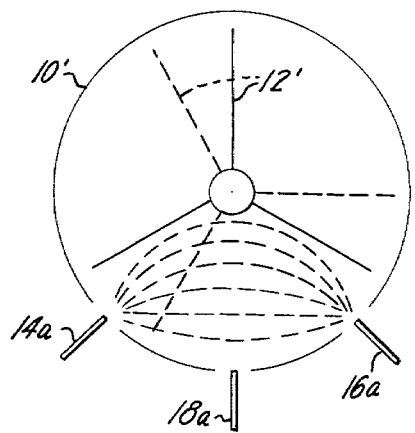
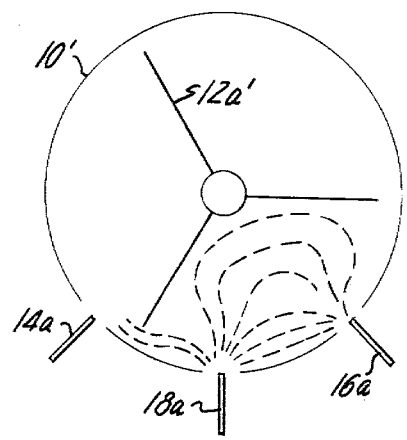
FIG.1A
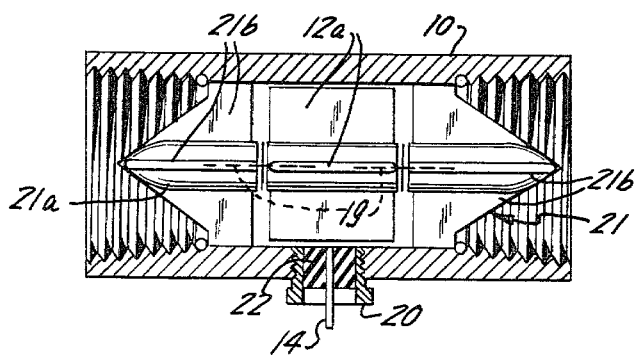
FIG.6
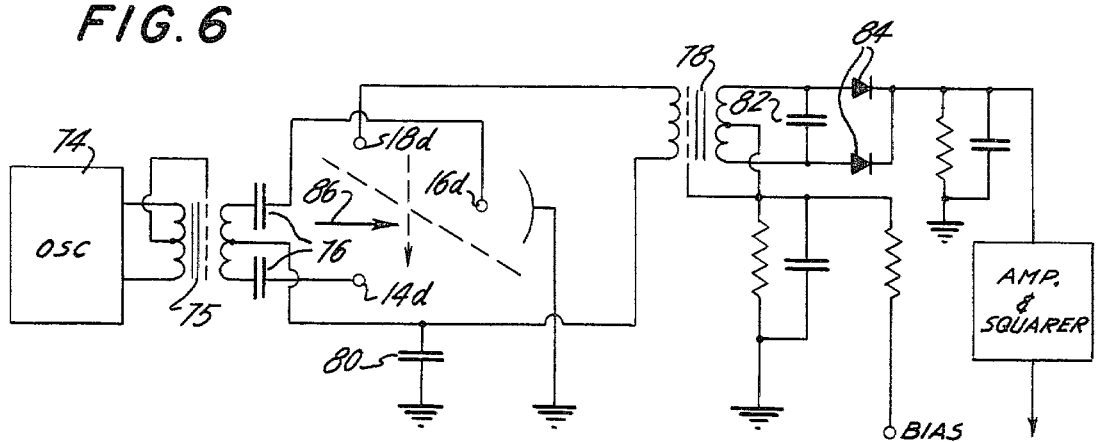

LIQUID FLOW SENSORS

This application is a continuation-in-part of application Ser. No. 06/031,416 filed Apr. 19, 1979, now abandoned.

BACKGROUND

The present invention relates to sensors for producing electrical signals representing the flow of liquid along a passage.

Certain known flow sensors use a rotor having vanes driven by the flowing liquid and a transducer that translates motion of the rotor into electrical output waves or pulses. Such signals are supplied to a counter or other receiving apparatus, the frequency of the signals being a representation of the flow rate. For example, one or more magnets on the rotor are carried past a magnetostrictive device mounted close to the path of the magnet(s), producing output pulses. In another flow sensor, a high-frequency-excited coil of a resonant circuit in an oscillator has been located close to a vaned rotor in a flow passage, where the amplitude of oscillation is varied by dielectric portions of the rotor sweeping into and out of the field of the oscillator coil. Such flow sensors involve objectionable physical complexity. Correspondingly, those flow sensors tend to be somewhat costly, a matter of concern in a competitive market.

OUTLINE OF THE INVENTION

The present invention utilizes a vaned liquid-driven rotor in the liquid passage, designed so that its rotation and rate of rotation accurately represent the volume and rate of flow over a range of liquid flow rates. Plural excitation electrodes pass current through the liquid, especially ordinary tap water. As the rotor rotates, it modifies the configuration of the current path or paths through the liquid. A sensing circuit which may use the excitation electrodes or which may include one or more additional electrodes derives the flow-representing signal.

In the preferred embodiments of the invention detailed below, the electrodes are energized by an alternating current source whose frequency is substantially higher, preferably of a higher order of magnitude, than the frequency of the rotor vanes passing the electrodes at the maximum rate of flow to be metered. The rotor modifies the impedance or impedances of the portion or portions of the circuit through liquid, so as to yield a modulated-carrier signal. The modulation and its frequency represent the volume and rate of liquid flow. Ample signal strength is developed by the electrodes so that need for great amplification and its related problems are avoided. The circuits function well despite a wide range of resistivities of the liquid. The novel sensors have been found in practice to exhibit stable characteristics, and even low-cost electrodes have proved durable, resisting corrosion and electrical erosion. Sensing of the rotor's rotation avoids loading the rotor and errors related to such loading. Narrow clearance between the rotor and the electrodes, and close tolerance of such clearance, are not required.

Accordingly, an object of the invention resides in the provision of a novel, relatively inexpensive liquid-flow sensor for providing electrical output signals representing volume and rate of liquid flow. More particularly, an object of the invention resides in providing such a liquid-flow sensor having energized electrodes that develop one or more current paths through the liquid, the impedance of the circuit through the liquid being modified by a vaned rotor in the flow passage and yielding a flow-representing signal.

Related objects reside in providing novel electrical liquid flow sensors that provide substantial output signal without resort to great amplification; that involve little concern for pick-up of extraneous signals or "noise"; that are tolerant of wide variations in the resistivity of the liquid to be sensed; that avoid inaccuracies arising out of imposing drag on the liquid-driven rotor; that involve only limited precision as to the dimensions of the mechanical portion of the apparatus; and that are remarkably simple without sacrificing accuracy or efficiency and can be produced at relatively low cost.

The nature of the invention and further objects and novel features will be more fully appreciated from the following detailed description of the illustrative embodiments shown in the accompanying drawing.

DESCRIPTION OF THE DRAWINGS

In the accompanying drawings:

FIG. 1A is a longitudinal cross-section of a portion of FIG. 1 in the 45° plane containing the axes of the pipe 10 and electrode 14;

FIGS. 1B and 1C represent diagrammatic views of portions of FIG. 1, with a 3-vane rotor;

FIG. 6 is a wiring diagram of a further presently preferred novel liquid-flow sensor including a diagrammatically represented liquid-flow portion of the sensor.

DETAILED DESCRIPTION OF ILLUSTRATIVE LIQUID-FLOW SENSORS

Figure 1:
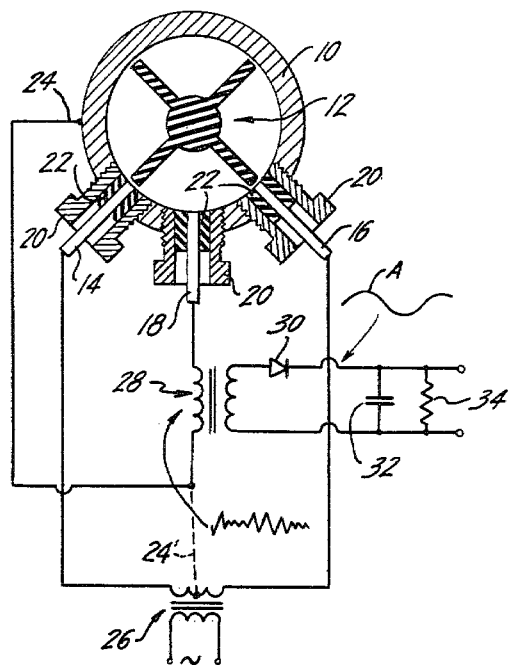
FIG. 1 represents a physical portion of a presently preferred form of the novel liquid-flow sensors, shown in cross-section transverse to the direction of liquid flow, together with the related electrical circuit.

Referring now to the drawings and FIGS. 1 and 1A in particular, cylindrical wall 10 which may be an ordinary piece of pipe defines the liquid-flow passage. A four-vaned rotor 12 is suitably mounted for rotation in the liquid-flow passage. The vanes 12a of the rotor are shaped like turbine blades so as to be driven by the liquid as nearly proportional as possible to the flow rate despite a wide range of different flow rates to be monitored. Three electrodes 14, 16 and 18 are mounted in plugs 20 threaded into wall 10 and separated therefrom by insulators 22 that also form liquid seals. Electrodes 14, 16 and 18 have ends that are flush with the cylindrical inner surface of wall 10, or they may be adjusted closer to the path of the vanes. Rotor 12 has pivots 19 (FIG. 1A) that project into end supports 21 having a bearing 21a carried by flow-straightening vanes 21b which bear against the inside surface of the pipe.

In the illustrated structure, vaned rotor 12 is of electrical insulation, selected for dimensional stability and immunity to attack by the liquid. Polypropylene and special grades of nylon have been found suitable for use with tap water. Polysulfone is presently preferred. The resistivities of these grades of nylon range from $10^{11}$ to $10^{14}$ ohm-centimeter cubes, and is higher for the other two materials. In FIG. 1, wall 10 and threaded plugs 20 are of metal and constitute an electrode by virtue of connection 24. Successful electrodes 14, 16 and 18 have been made of stainless steel as well as of brass.

A transformer 26 has its primary winding connected to an alternating-current source, and the transformer secondary energizes electrodes 14 and 16. The current path and the voltage gradient that develops in the liquid are modified by the changing orientation of the vaned rotor in relation to the electrodes. In the illustration, there are four vanes displaced 90° apart, electrodes 14 and 16 are separated 90°, and electrode 18 is midway between them. Using a pipe of 1.0 inch inside diameter, in an example, the outside diameter of the rotor to the radial extremities of the vanes 12a was about 0.95 inch so that there was a clearance of about 0.020 to 0.030 inch between the radial extremities of the vanes and the inside diameter of the pipe. The diameter of the hub or core 12b was about ⅜ inch. The width of the vanes along the hub was about 0.6 to 0.7 inch, with straight edges parallel to the axis except at the corners which were rounded. The vane thickness varied from 0.050 to 0.060 inch at the hub to 0.020 to 0.030 inch at the outer extremities which were somewhat champhered. The end edges of the vanes were rounded for reducing turbulence. The diameter of electrodes 14, 16 and 18 exposed to the liquid was about 0.125 inch and insulators 22 had an outer diameter of about ¼ inch.

The circuit between electrodes 14 and 16 includes the primary of output transformer 28, electrodes 10/24 and 18, and a changing path through the liquid. The secondary of transformer 28 is connected to rectifier 30 and a filter comprising capacitor 32 and resistor 34. In operation, a carrier appears at the input of transformer 28 that is both amplitude-modulated and phase-modulated. The amplitude-demodulated output appears at the output of the filter. Zero output occurs when two vanes are opposite electrodes 14 and 16 and when a vane is opposite electrode 18. In an example, the frequency of the energizing source was 2.5 kHz and at the maximum end of the flow rate to be metered, rotor 12 operated at 600 rpm. In a one-inch pipe, this corresponds to a flow rate of 10 gallons per minute.

As already noted, the circuit shown uses an amplitude detector in the output. Since phase modulation occurs, a phase detector can be used. In an example, the maximum change in resistance during rotation of the rotor in tap water was 15.5 to 16.4K ohms between the center electrode and an outer electrode. The capacitance change was 850 to 990 pF.

The operation of the sensor of FIG. 1 may be further explained as follows. If there were no rotor in place, electrodes 18 and 24 would have balanced exposure to the potential at electrodes 14 and 16, with both alternating current and direct-current excitation. When the rotor is present and with its vanes disposed symmetrically in relation to electrode 18 (both when the vanes are equally spaced from electrode 18 and when one electrode is aligned opposite electrode 18) the same balanced condition exists. This condition is generally the same as if there were a connection 24' to the center-tap of the secondary of transformer 26, replacing connection 24 to metal pipe 10. (With that change, pipe 10 can be either of metal or of insulation). However, with the 4-vane rotor displaced clockwise or counterclockwise by any angle between 0° and 45°, 22½° for example, the broad area of a vane becomes an insulating barrier that blocks myriad current paths between electrode 18 and electrode 14 or 16 while affording a generous cross-sectional area of liquid for a pattern of myriad current paths between electrode 18 and electrode 16 or 14. The longer paths have much greater resistance and thus they contribute little to the output current. However, there is a great disparity between the available volumes of liquid through which patterns of current paths extend between electrodes 14 and 18 as compared with the current paths between electrodes 18 and 16 when the rotor is displaced from symmetry relative to electrode 18.

The relationship between the vanes and the electrodes as discussed above in connection with FIG. 1 should be considered three dimensionally. Thus, it will be recognized that, if a vane were positioned halfway between electrodes 14 and 18, it does not cut off all current flow between the electrodes. As seen in FIG. 1, there is a limited cross-section of liquid between the pipe and the outer edge of the vane due to the need for practical, non-critical clearance, and there are also myriad current paths between these electrodes extending in the volume of the liquid reaching and leaving the vane. Quite similar current paths would exist even if there were no vane interposed between the electrodes 14 and 18. Consequently, a vane when interposed between two electrodes serves as a wall suppressing some current paths through the volume of liquid between the electrodes in an imaginary pattern of paths like that which existed before the vane was interposed.

The foregoing may be visualized in the more general geometry of vanes and electrodes in FIGS. 1B and 1C in which the vanes 12a' are 120° apart and electrodes 14a and 16a are 90° apart. In FIG. 1B, the dotted lines represent current paths through the volume of liquid in the pocket between two vanes but the only paths that appear are those in the plane of the drawing. Myriad additional paths extend between the electrodes, bowing outward into the volumes of liquid to both sides of the plane of FIG. 1B. The pattern of current paths is virtually the same as if the rotor were absent, disregarding longer current paths.

In FIG. 1B, the rotor is shown in dotted lines, with one vane between electrodes 14a and 18 where it intersects the lines representing current paths. Part of the resulting pattern of current paths is shown in FIG. 1C. The dotted lines between electrodes 14a and 18a indicate some limited current flow that bypasses the outer edge of the vane. To this there should be added the aggregate current that flows in the long paths around the edges of the vane at both ends of the rotor. Those long paths are comparable to paths that extend into the volumes of liquid that exist to both sides of the plane of FIG. 1B, bowing outward toward the ends of the vane. In contrast, there are many more current paths between electrodes 16a and 18a in FIG. 1C. In a sense, the position of the rotor in FIG. 1C causes current to be supplied by the right-hand half of secondary of transformer 26 (FIG. 1) via electrodes 16 and 18 to transformer 28.

Figure 2:
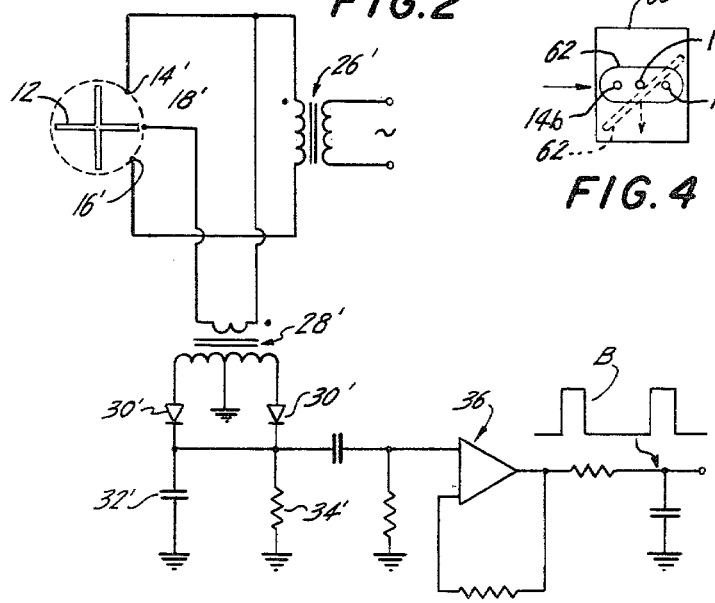
FIG. 2 is a wiring diagram of another presently preferred novel liquid-flow sensor including a diagrammatically represented liquid-flow portion of the sensor.

The flow sensor of FIG. 2 uses parts 10, 12, 14, 16, 18, 20 and 22 as in FIGS. 1 and 1A, formed and proportioned as described, but FIG. 2 represents a modification of the sensor in FIG. 1 in several respects. Primed numerals in FIG. 2 designate elements correspondingly numbered in FIG. 1, proportioned as described and as shown in FIG. 1A. A pipe of metal or plastic may be used with the same four-vane rotor 12'. Two electrodes 14' and 16' are energized as before by the secondary of transformer 26'. A third electrode 18' is located between electrodes 14' and 16'. The primary of output transformer 28' has its terminals connected to electrodes 14' and 18'. In an example, electrodes 14' and 18' are centered 40° apart and electrodes 16' and 18' are centered 50° apart, used with a rotor whose blades are 90° apart. Angles of 30° and 40°, respectively, have also proved successful with this circuit and with a 4-blade rotor. In operation, the circuit configuration through the liquid varies as the rotor rotates, producing a modulated carrier at transformer 28'. When a vane is interposed between electrodes 16' and 18', it suppresses current paths through the liquid that would exist otherwise. The action is the same as that represented at the left-hand part of FIG. 1C. At that time there is no vane between electrodes 14' and 18', but there is no excitation voltage in the loop 14'-28'-18' to induce current to flow through the liquid between electrodes 14' and 18'. At this time the liquid serves as a loading resistor tying electrode 18' to electrode 14' and in that way improves the signal-to-noise ratio. When a vane moves out of the potential field in the volume of liquid between electrodes 16' and 18' and that vane (or another) is disposed in the liquid volume affected by the voltage field between electrodes 14' and 18', excitation from transformer 26' causes maximum current flow through the liquid between electrodes 16' and 18' (as represented at the right in FIG. 1C) and through the primary of transformer 28'. At this time, electrode 14' seems to increase the output somewhat over what it would have been had electrode 14' been omitted. On the other hand, the circuit of FIG. 2 is operative with electrode 14' omitted. Such a two-electrode system is within present contemplation.

The output of the circuit shown in FIG. 2 may be demodulated by the full-wave rectifier circuit shown, including the centertap of the secondary and diodes 30', and a filter comprising capacitor 32' and resistor 34' is connected across the output. In an example, peak modulation of 2 volts is produced for 18 volts peak-to-peak of energization at 1000 Hz. The carrier frequency is not critical, so long as it is much higher than the maximum rate of the vanes passing the electrodes.

In FIG. 2 the demodulated output wave is coupled to a high-gain operational amplifier 36 where the output wave (see wave A, FIG. 1) is converted to square-wave B. Of course, a high-gain squaring amplifier may be added to the circuit of FIG. 1 for correspondingly shaping and limiting the output signal.

The signals produced by the liquid-flow sensors of FIGS. 1 and 2 are useful for operating electronic or electromagnetic counters, with an appropriate frequency-divider circuit interposed, to read the total liquid flow; or the signal can be converted by a suitable frequency-measuring circuit to yield a measure of flow rate. Further, the output signal can be used in more complicated apparatus, for example a heat meter wherein the difference between inlet and outlet temperatures is multiplied by signals representing flow volume which can be provided by the present sensors, as with circulating hot-water domestic heat systems and with solar heat exchangers.

Figure 3:
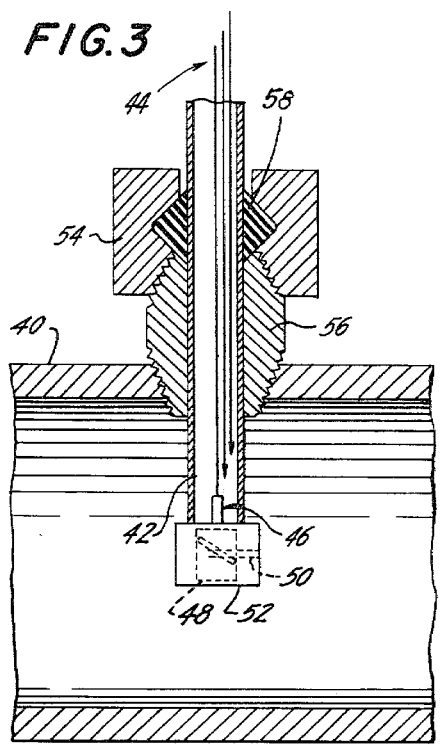
FIG. 3 is a cross-section, taken along the direction of liquid flow, of a modification of a portion of the flow sensors of FIGS. 1 and 2.

FIG. 3 illustrates a modified form of the physical apparatus involving the electrodes, the flow passage, and the rotor of FIG. 1 or FIG. 2. Pipe 40 has a threaded opening in which a flow-sensing probe is mounted. This probe includes a tube 42 whose bore is filled with a material acting as electrical insulation and a liquid sealant. Leads 44 extend to electrodes 46 (only one being shown) distributed about rotor 48 which rotates about shaft or spindle 50. A flow-guiding structure 52 is included, comprising a cylindrical shroud and conventional fixed flow-directing blades in radial planes through the axis at the inlet end of the rotor. For example, a clearance of 0.020 inch between the rotor vanes and both the shroud and the electrodes, with a 0.8 inch diameter rotor has been found quite satisfactory. Indeed, it is possible to omit the shroud entirely. The electrodes can be distributed, proportioned and used with circuits as in FIGS. 1 and 2. The rotor can have various numbers of blades, whether three, four or more. The probe of FIG. 3 can be calibrated for use with various diameters of pipe 40, and this kind of probe can be installed in an existing system. An adjustable gland is provided for this purpose, comprising threaded clamp 54 on plug 56 to squeeze gasket 58 against tube 42.

Figure 4:
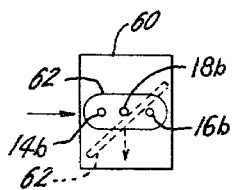
FIGS. 4 and 5 are fragmentary diagrammatic illustrations of different electrode configurations useful in the liquid-flow sensors of FIGS. 1-3.
Figure 5:
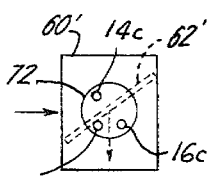

FIGS. 4 and 5 show two modifications of the electrode configuration useful in the probe of FIG. 3, also useful in the sensors of FIGS. 1 and 2. Cylindrical pipe or shroud 60 has a sealed flattened oval assembly 62 of electrodes 14b, 16b and 18b, fixed opposite vaned rotor 62. The electrodes are distributed along the path of flow of the liquid represented by arrow 61. The outer edges of the rotor vanes extend slantwise across the row of electrodes, and is operable as is conventional about an axis extending along the flow path. In this way, the edge of each rotor vane sweeps past the electrodes in succession, corresponding to the action in FIGS. 1, 1B, 1C and 2.

In FIG. 5, sealed tube 60' supports three electrodes 14c, 16c and 18c in a right-angles pattern opposite the slanted edges of the rotor blades 62'. The construction and operation of the device of FIG. 5 is otherwise the same as that of FIG. 4.

The circuits of FIGS. 1, 2 and 6 can be used with the electrode configurations of FIGS. 4 and 5. The electrode numerals (disregarding their alphabetic distinctions) indicate their connection in the several circuits.

FIG. 6 illustrates a further presently preferred electrode configuration, useful as an alternative to those of FIGS. 1, 4 and 5 together with a circuit useful in place of those of FIGS. 1 and 2. Oscillator 74 provides excitation to electrodes 14d and 16d through excitation transformer 75 and coupling capacitors 76. Terminals of the primary of output transformer 78 are connected to electrode 18d and to the center-tap of the secondary of transformer 74 which is bypassed to ground by capacitor 80. If pipe 10d is of metal, it is advantageously treated as a shield and grounded. Capacitor 82 across the secondary of output transformer 78 resonates with the secondary and the output transformer presents high impedance to the circuit of output electrode 18d. In this way the circuit is made more immune to variations in resistivity of the liquid. It works well both with tap water and with distilled water that is inevitably contaminated slightly by the flow-metering apparatus even after repeated rinses with distilled water. Diodes 84 are detectors, forward-biased for improved sensitivity, as shown. A high-frequency bypass circuit shunts the detector output, which is amplified and squared, and used to drive volume and/or flow-rate meters.

Electrodes 16d and 18d are arranged at an angle to the direction of fluid flow (represented by arrow 86). The edge 12d of each successive vane (represented by a broken line) of a turbine-vaned rotor moves into simultaneous alignment with both electrodes 16d and 18d. Electrode 14d is equidistant from electrodes 16a and 18a, these electrodes forming an equilateral triangle. When a vane is in the position illustrated, one-half of the secondary of excitation transformer 75 provides drive voltage in the loop 16d, 18d, primary of 78, 76. When no vane is disposed in the volume of liquid between electrodes 14d and 18d, electrode 18d is at a balanced potential between electrodes 14a and 16a, the potential of the centertap, and there is no output. There is one output pulse each time a vane enters the space between electrode 14d and electrodes 16d and 18d, as in the case of FIG. 2 whereas the circuit of FIG. 1 produces two pulses each time a vane passes the electrode assembly.

The described liquid flow sensors utilizing variable impedance offer advantages of low cost, they are operative with various fluid mediums, and the action involved in deriving the output signal imposes no loading or drag on the rotor that would tend to introduce error. Alternating current energization of the electrodes has been described, but direct-current can also be used. The apparatus is tolerant of a wide range of variables, as frequency and amplitude of energization of the electrodes, spacings, and fluid characteristics. Effective operation has been demonstrated with both tap water and distilled water.

The described rotors are formed of a plastic having electrical properties, resistivity and dielectric constant, that contrast with those of tap water and distilled water or other liquid whose flow is to be observed. This condition results in changing circuit impedance as the vanes of the rotor change their orientation in relation to the electrodes. The marginal edges of the vanes sweep past the electrodes in succession in producing this effect. Modified relationships of the electrodes and the vanes can also produce this effect, and either alternating current or direct current may be used. Instead of a turbine-type of rotor, a "paddle-wheel" rotor may be used, with the vanes arranged to pass various forms of electrode assembly such as those in FIGS. 1, 2, and 4–6.

The foregoing description of the illustrative embodiments of the invention and of modified protions are presently preferred but they can be further modified variously by those skilled in the art. Consequently, the invention should be construed broadly in accordance with its full spirit and scope.

What is claimed is:

1. A liquid flow sensor for water or similar liquid having some electrical conductivity, including a rotor adapted to be rotated about its axis by flowing liquid and having vanes of much higher resistivity than that of the liquid, means for supporting the rotor within a wall defining a liquid flow passage whereby rotation of the rotor may be calibrated in terms of liquid flow within the wall, and an electric circuit for producing signals representing the flow of the liquid, said circuit including plural excitation and sensing electrodes at least two of which are disposed in proximity to the path of said vanes, said electrodes being exposed to the liquid and said two electrodes acting in the absence of said rotor, to form a pattern of paths of current therebetween, said vanes being movable successively into a position clear of substantial current paths between said two electrodes and into positions wherein a substantial portion of said pattern of paths would extend through the thickness of said vanes but is suppressed thereby.

2. A liquid-flow sensor as in claim 1 for use with tap water wherein the rotor is of a plastic whose resistivity is much greater than that of tap water.

3. A liquid-flow sensor as in claim 1 wherein the electric energizing means is alternating-current means having a frequency that is much higher than the highest frequency at which successive vanes of the rotor pass the electrodes over the range of flow rates to be observed.

4. A liquid-flow sensor as in claim 1 wherein plural electrodes comprising at least three electrodes are included having respective portions exposed to the liquid, and wherein the circuit includes an alternating-current supply having opposite terminals connected to two of the electrodes and wherein the output circuit includes at least one electrode other than said two electrodes.

5. A liquid-flow sensor as in claim 4 wherein terminals of an output circuit are connected, respectively, to said other electrode and to said alternating current supply.

6. A liquid-flow sensor as in claim 4 wherein terminals of an output circuit are connected, respectively, to said other electrode and to the mean potential point of said alternating current supply between said two electrodes.

7. A liquid-flow sensor as in claim 1, including a pipe forming said wall and wherein said vanes have edges of substantial length along the pipe and are spaced narrowly therefrom.

8. A liquid-flow sensor as in claim 1, wherein said wall is of metal and is connected to a point of stable potential in said circuit.

9. A liquid-flow sensor as in claim 1, wherein said wall is a pipe of much greater diameter than said vaned rotor and in which said electrodes and said rotor are supported as a probe within the pipe.

10. A liquid-flow sensor as in claim 1 wherein the electrodes have localized areas exposed to the liquid distributed in such a pattern of locations that an edge of each vane sweeps past said areas successively.

11. A liquid-flow sensor as in claim 1 wherein said electrodes have localized areas exposed to the liquid and are distributed so that an edge of each said vane comes simultaneously opposite two of said areas and opposite the third area at a different time in the rotation of the rotor.

12. The method of sensing the flow of liquid including the steps of exposing areas of at least two electrodes to the liquid and electrically energizing said two electrodes to develop a pattern of current paths through a volume of the liquid, disposing a vaned rotor in the liquid to be rotated by the flow thereof and thereby operate the vanes past said two electrodes successively into positions wherein a substantial portion of said current paths would extend through the thickness of a vane but are suppressed thereby and into positions clear of such substantial current paths.

* * * * *